United States Patent

Milberger et al.

[15] 3,700,928

[45] Oct. 24, 1972

[54] FAST PULLDOWN TRANSMISSION LINE PULSER

[72] Inventors: Walter E. Milberger, Severna Park; Wayne L. Weigle, Ellicott City, both of Md.

[73] Assignee: Westinghouse Electric Corporation, Pittsburgh, Pa.

[22] Filed: July 30, 1969

[21] Appl. No.: 846,154

[52] U.S. Cl. ......................307/268, 307/282, 328/34

[51] Int. Cl. ...............................................H03k 5/00

[58] Field of Search .........307/268, 253, 282; 328/34, 328/114; 315/20

[56] References Cited

UNITED STATES PATENTS

| | | | |
|---|---|---|---|
| 3,215,858 | 11/1965 | Harding et al. | 307/254 |
| 3,308,308 | 3/1967 | Bray | 307/282 |
| 3,470,391 | 9/1969 | Granger | 307/268 |

OTHER PUBLICATIONS

Seitzer, " Fast Recovery Pulse Generators," IBM Tech. Disclosure Bulletin, Nov. 1966, Vol. 9, No. 6.

*Primary Examiner*—Benjamin A. Borchelt
*Assistant Examiner*—S. C. Buczinski
*Attorney*—F. H. Henson, E. P. Klipfel and J. L. Wiegreffe

[57] ABSTRACT

A switching transistor is used to pulse a high voltage radar transmission tube on and off. Each time the switching transistor turns off, positive feedback is applied thereto by a pulldown transistor to steepen the trailing edge of the switching transistor output pulse and overcome the inherent delay in transistor turn off due to storage effects. The pulldown transistor is responsive to voltages generated by the transient component of the trailing edge of the switching transistor, and therefore applies the feedback just as the switching transistor starts to turn off. The pulldown feedback is effective immediately because its application is limited only by the relatively short turn on time of the pulldown transistor. Transformers of the transmission line multifilar toroid type or of the loop coupling toroid type are employed to generate a high voltage pulse for controlling the radar transmission tube at its grid or cathode.

12 Claims, 2 Drawing Figures

PATENTED OCT 24 1972

3,700,928

INVENTORS
Walter E. Milberger &
Wayne L. Weigle.
BY Ernest P. Klipfel
ATTORNEY

FAST PULLDOWN TRANSMISSION LINE PULSER

BACKGROUND OF THE INVENTION

1. Field of the Invention

This invention relates to video pulser circuits for radar traveling wave tubes and klystrons, and more particularly to such pulsers employing pulldown circuits for steepening the trailing edge of the output pulse.

2. Description of the Prior Art

Heretofore, positive feedback or pulldown circuits have been employed in radar systems to steepen the trailing edge of the transistor pulser output pulse. Inherent storage effects present across the layers of this switching transistor prolong its turn-off response. The resulting lagging wavefront is intolerable at the high speeds of video radar circuits. These prior art pulldown circuits applied positive feedback in response to either the trailing edge of the input pulse of the pulser, or in response to a separately timed external pulse. In neither case was the feedback applied at the most opportune instant during the turn off of the switching transistor, i.e., during the incipient phase of turn off. Pulses applied to the pulldown circuit after the earliest detectable change in the switching transistor conduction did not provide the shortest turn off time and the steepest possible trailing edge. Pulses applied to the pulldown circuit before this most opportune instant caused positive feedback to be applied to the switching transistor while it was still fully conducting possibly destroying the transistor.

It is desirable in these pulldown circuits for the application of positive feedback be directly dependent upon a change in the conduction of the switching transistor. Feedback controlled by the lagging edge of the pulser input signal may cause feedback to be applied while the switching transistor is still fully conducting or at least before an adequate change of conduction has transpired in the switching transistor. Feedback controlled by a separately timed "OFF" pulse may apply positive feedback before or after the switching transistor has undergone a sufficient change in conduction.

An additional problem encountered in the pulsers of the prior art was corona insulation breakdown caused by the high DC voltage required to operate the radar transmission tubes. During continuous operation, the corona fingers gradually extended throughout the high voltage insulation of the load and load transformer eventually causing breakdown and circuit failure.

SUMMARY OF THE INVENTION

Accordingly, it is an object of this invention to provide a more reliable video pulser having an output with a steep trailing edge.

It is another object of this invention to provide a video pulser having a pulldown circuit which does not require a conventional B plus voltage supply.

It is a further object of this invention to provide a video pulser employing high gain bandwidth transformers and provided with protection against the flyback voltage generated within the windings of these transformers.

It is yet another object of this invention to substantially eliminate the hazards of corona breakdown in the high voltage circuits.

Briefly, the present invention accomplishes these and other objects by providing a pulser switching transistor which is controlled by an input pulse and which in turn controls a TWT or load. A high pass filter is provided for coupling the high frequency component of the switching transistor output to a pull-down transistor. A feedback coupling transformer electrically communicates positive feedback from the pulldown transistor to the output of the switching transistor. Because the application of the positive feedback is directly responsive to the output of the switching transistor, it not only appears at exactly the same time during each successive turn off, but due to the design of the pulldown circuit the positive feedback appears at the most opportune instant during turn off. This proper pulse timing protects the switching transistor from over conduction and increases the reliability of the circuit. Reliability is further enhanced by providing a plurality of parallel switching transistors operating simultaneously. If one transistor fails, the pulsing current redistributes among the remaining transistors and the pulsing operation continues.

The pulldown transistor does not require the conventional continuous B plus supply voltage. Transient voltages induced backwards across the feedback transformer during the transient portion of the switching transistor output are adequate to operate the pulldown transistor during the feedback period. That is, the same transients generated in the turn off of the switching transistor which provide the input signal to the pulldown transistor through the highpass filter, also provide the supply voltage for the pulldown transistor through the feedback transformer.

The inductive kick or flyback voltages generated by the collapsing fields generated in the feedback transformer windings during turnoff of the switching transistor are intolerable at the fast switching speeds required here. The faster the switching time and the steeper the trailing edge of the output pulse, the greater is the flyback voltage. In order to protect the transistors against damage due to this excessive voltage a fast acting Zener switching device is connected across the collector and base of each transistor. As the flyback voltage develops, the Zeners conduct causing a portion of the flyback current to flow into the base of each transistor. This added drive current turns the transistors more fully on and the dangerous flyback energy is dissipated to ground through the transistor.

Corona breakdown is minimized by eliminating the continuous application of high voltage to the transmission tube through the conventional supply. Instead the required high voltage is generated by passing the pulser output pulse through a step-up loop coupling toroid transformer. The high voltage is supplied by the output pulse itself and hence is applied only for the duration of the control pulse.

DESCRIPTION OF THE PREFERRED EMBODIMENTS

Figure 1:
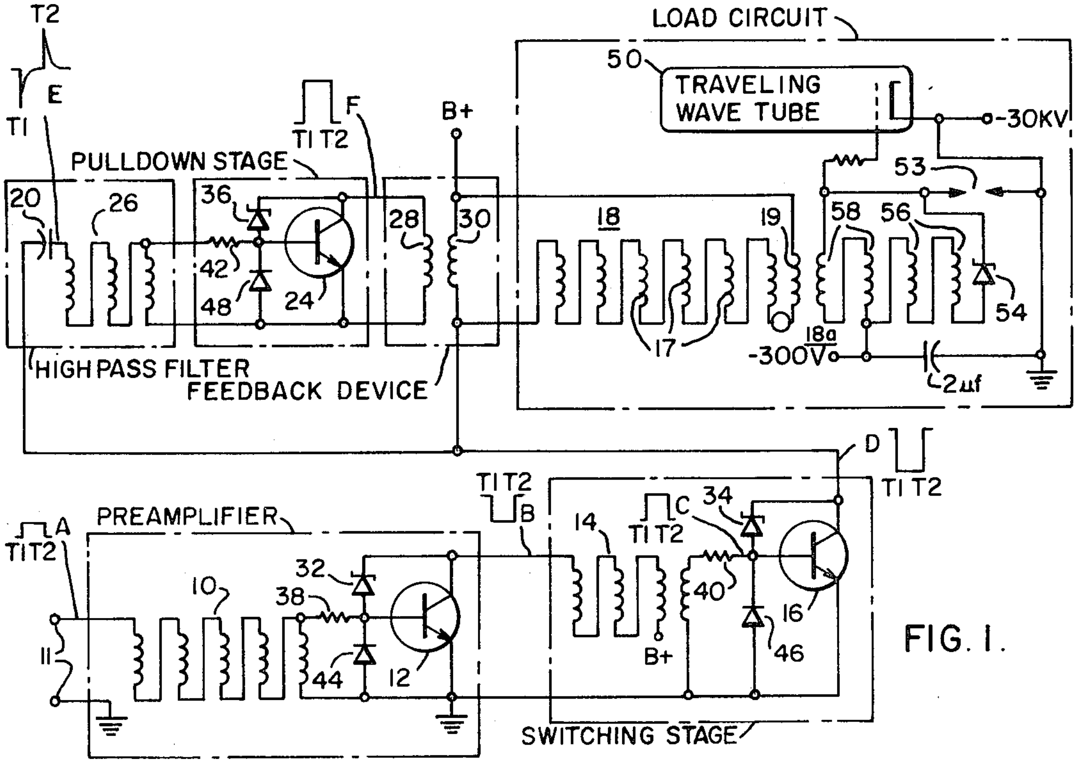
FIG. 1 is a schematic diagram of a video pulser circuit for pulsing the grid of a TWT, showing the components of each stage included within a labeled block.

Referring to FIG. 1, positive input pulse A (shown by the waveform) is applied to the input terminals 11 of the preamplifier stage included within the labeled block. A transmission line transformer 10 provides impedance matching between a preamplifier transistor 12 and the source of input pulse A. In order to provide a greater drive current to the base of the preamplifier transistor 12, transformer 10 may be of the current step-up type. The output of the preamplifier (a negative pulse, waveform B) is applied to a switching stage or amplifier shown in a block so labeled. Output B is applied to a transmission line transformer 14 which steps up the drive current to a switching transistor 16. It is preferred that the input signal to switching transistor 16 be positive (as shown by waveform C), therefore transformer 14 is reverse wound. The output of the switching stage (a negative pulse shown at D) is applied through transmission line load transformers 18 and 18*a* to the TWT and associated load circuitry indicated by a block labeled "load."

The output D of the switching stage is also applied to a positive feedback loop formed by a high pass filter, a pulldown stage, and a feedback coupling device each indicated by an appropriately labeled block. The output D is first differentiated by a high pass filter capacitor 20 generating the negative and positive spikes shown at waveform E. These spikes E are applied to the base of a pulldown transistor 24 through a transformer or signal developing impedance 26. Transformer 26 is also preferably a current stepup transmission line transformer to increase the base drive to transistor 24. The spikes E appear at transistor 24 only during the transient portion of output D. At time T1, when output D is going negative the input to the pulldown transistor 24 is the negative spike. At time T2, when output D is going positive, the input to transistor 24 is the positive spike. The T1 negative spike has no effect on transistor 24 which is non-conducting at T1. However, the positive spike at T2 turns pull-down transistor 24 on causing a sharp drop in its collector voltage as shown by waveform F. This rapidly negative going voltage is induced across the feedback coupling device which forms a part of load transformer 18. Transformer 18 has a separate pulldown winding 28 which is connected across pulldown transistor 24, and an auto primary or switching winding 30 which is connected to the collector of switching transistor 16. The remainder of the primary 17 of transmission line transformer 18 along with the primary 19 and secondary windings 56, 58 of transformer 18*a* is shown in FIG. 1 as part of the load block. The negative going output of pull-down transistor 24 appears at T2 and is induced across the feedback circuit through windings 28 and 30 to the output of the switching stage. Pulldown winding 28 reverses the spike and provides a steep positive going voltage at T2 which supplements the positive going trailing edge of output D at T2. This positive feedback steepens the trailing edge of pulser output to provide a sharper, faster pulser action.

In operation, all of the transistors and the load or TWT are perferably normally off. Conduction occurs only during the pulse period between T1 and T2 as in Class C or switching operation. At T1 the positive pulse A appears at the preamplifier input 11. After being amplified twice and reversed three times, this signal appears at the pulser output as output D. For the duration of this pulse, preamplifier transistor 12, switching transistor 16, and the load TWT are conducting. At T2 input pulse A drops to zero and transistors 12 and 16 begin to turn off. Inherent capacitive and storage characteristics of the transistors prevent them from turning off as fast as they turn on. In video applications a fast turn off time is essential. Transistors suitable for video circuits are capable of turning on in 8 nano seconds at a collector current of 28 amps. The turn off time of these transistors, unaided by the present pull-down feature is 300 nanoseconds. The pulldown operation described below expedites turn off, decreasing the turn off time to 50 nanoseconds.

The pulldown stage is responsive to the positive spike in waveform E generated by the trailing edge of pulser output D. This spike represents the high frequency component of the trailing edge and is applied to pull-down transistor 24 through the high pass filter formed by differentiating capacitor 20 and signal developing impedance or inductance 26. This positive spike turns transistor 24 on immediately (within 6 nanoseconds) producing the amplified negative going collector voltage F. The pull-down output F is induced into the pulser output in reverse form as a positive going voltage which reinforces the positive going trailing edge of D while switching transistor 16 is still in the early stages of turn off. This immediate application of amplified positive feedback is possible because the pulldown stage is responsive to the high frequency component of the pulser output trailing edge. This signal component is immediately available at the first change in voltage of the pulser output. Further, pull-down transistor 24 has a fast turn on action due to the absence of delaying storage effect incident to transistor turn off. Thus, in the present invention, the pulldown stage does not become operative until switching transistor 16 has started to turn off. This avoids the prior art problem where the above relationship was not true and positive feedback was fortuitously applied, possibly while switching transistor 16 was still fully conducting causing the destruction of the transistor and associated circuit.

As can be seen from FIG. 1, the pulldown winding 28 in the feedback coupling portion of transformer 18 is connected across the collector and emitter electrodes of pulldown transistor 24. The collector is not returned to the B plus supply and is not supplied continuously with B plus voltage in the conventional fashion. The required collector voltage is provided precisely when needed by the transformer action of windings 28 and 30 which are of course in magnetic flux communication. The output D is induced and reversed into winding 28 where it appears as a positive voltage on the collector of transistor 24. A continuous collector voltage is not required because pulldown transistor 24 conducts only when supplying positive feedback to the pulser output trailing edge.

Each of the transistors 12, 16 and 24 has an inductance in its collector circuit in the form of transformer 14 and windings 28 and 30 of transformer 18 respectively. The inductive kick or flyback voltages generated in these windings by the collapsing magnetic fields therein at transistor turn off must be dissipated. For this purpose, Zener diodes 32, 34 and 36 are provided connected between the emitter and base of transistors 12, 16 and 24 respectively. When the flyback voltages cause the collector voltage of these transistors to exceed B plus, the corresponding Zener diode conducts causing increased base current into its associated transistor. The base current turns the transistor on full, dissipating the flyback energy harmlessly through the transistor. Small drive limiting resistors 38, 40 and 42 are connected to the base of each transistor. The Zener diodes are preferably rated to conduct when forward biased at a voltage slightly greater than B plus, which permits them to clip the positive flyback voltage spikes. Because the main flow of flyback current is dissipated through the transistors, low wattage Zener diodes may be employed. Heretofore conventional rectifying diodes were connected across the inductance for shorting all pulses of the flyback polarity. Large diodes were required when the flyback power was high. Not only were the large diodes expensive, but they also required a proportionately longer time to respond which made them inoperable in video applications. The smaller, less expensive Zener diodes employed in the present invention have response times more appropriate for video applications. The Zener diodes 32, 34 and 36 also function as conventional antistorage or saturation protection to prevent the transistors 12, 16 and 24 from bottoming. At full transistor conduction, collector voltage approaches B plus and the Zener diodes become forward biased and conducts a portion of the drive current away from the transistor base.

Each of the transistors 12, 16 and 24 also has an inductance in its base circuit in the form of transformers 10, 14 and 26. A similar flyback voltage is generated in these windings at transistor turn off as the base current of each transistor drops to zero. Therefore, diodes 44, 46 and 48 are provided connected between ground and the base of each of the transistors to short or clip the negative flyback voltage spikes and prevent base-to-emitter avalanche or breakdown.

The load circuit shown in the block in FIG. 1 includes a radar traveling wave tube 50 provided with a spark gap 53 and arc suppressing or clipping Zener diode 54. Windings 56 and 58 which form the secondary of transformer 18a, are differential inductors connected in parallel for suppressing arcs originating from within the TWT 50. In order to minimize the turn off time of the TWT 50, its interelectrode capacitance must be discharged. The effect of this capacitance on the pulldown operation is increased as the square of the step-up turns ratio in the load transformer 18. The grid to cathode capacitance of about 50 pf is of primary concern here, and is reflected into the primary circuit as a 2450 pf farad capacitance by the 7:1 turns ratio. The discharge is accomplished through the pulldown stage which is reflected through transformer 18 as a low impedance when pull-down transistor 24 conducts. This low impedance allows the interelectrode capacitance to discharge as switching transistor 16 is turning off and shutting down TWT 50. If the interelectrode capacitance of TWT 50 were not discharged, the turn off time would be prolonged in proportion with the charge thereon. Other details and operation of this load circuit are described in U.S. Pat. No. 3,405,322 issued Oct. 8, 1968 to W.E. Milberger and W.L. Weigle entitled "Load Transient Reflection Suppressor with Differential Inductor Means Interposed in Parallel Line Circuits Between the Source and the Load."

The structure and operation of the transmission line transformers 10, 14, 18, 18*a* and 26 are well known and are adequately described in an article by C.L. Rutheroff in Proc. I.R.E. 47, 1337 (1959). These transformers have a high gain bandwidth and a short response time for the high frequency component because of the wire spacing which minimizes distributive capacitance and leakage inductance. In conventional transformers, these two reactive parameters resonant at video frequencies introduce limitations on the high frequency response. It is estimated that by minimizing the reactive parameters, the bandwidth of a transmission line transformer is one hundred times greater than the bandwidth of a corresponding conventional transformer. In addition, the absence of these reactive parameters permits an accurate calculation of characteristic impedance and offers a less complicated-single step impedance matching technique.

As a specific embodiment of the circuit shown in FIG. 1, the circuit components and voltages are listed below:

| | | |
|---|---|---|
| preamplifier transistor **12** | | 3TE150 |
| switching transistor **16** | | 3TE120 |
| pulldown transistor **24** | | 3TE120 |
| transformer **10** | | 5:1 step-down |
| transformer **14** | | 3:1 inverting |
| transformer **26** | | 3:1 step-down |
| transformer **18** | | 1:1 inverting, 1:7 step-up |
| transformer **18***a* | | 1:4 step-up |
| capacitor **20** | | 3900pf |
| Zener diodes **32**, **34** and **36** | | 70v |
| diodes **44**, **46** and **48** | | HPA1003 or IN3070 |
| resistors **38**, **40** and **42** | | 2 ohms |
| Zener diode **54** | | 1200v |
| spark gap **52** | | TG110 |
| Waveform | A + 5v, 20ma | |
| | B − 40v, 1 amp | |
| | C 13v, 3 amp | |
| | D − 55v, 28 amp | |
| Signal of grid of TWT **50**, m 350 v, 4 amp | | |
| B plus 60 v | | |

Figure 2:
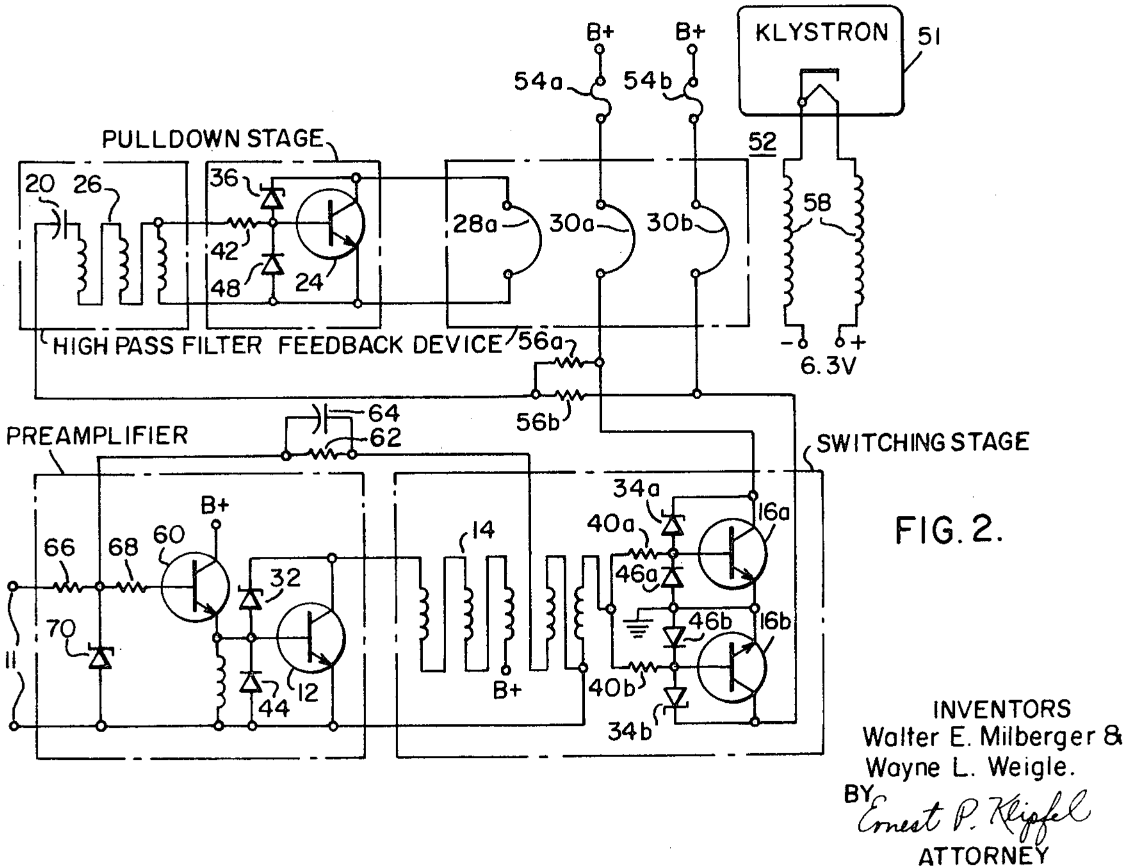
FIG. 2 is a schematic drawing of a cathode pulsed klystron embodiment of the video pulser circuit showing switching transistors connected in parallel and a loop coupling high voltage step-up transformer.

FIG. 2 shows a klystron cathode pulser embodiment of the pulser and pulldown circuits discussed in reference to FIG. 1. A comparison of the block diagram and waveforms of the FIG. 1 grid pulser and the FIG. 2 cathode pulser shows similarity between the circuits. Many of the intrablock components remain unchanged and retain their FIG. 1 reference characters. Of course, a cathode pulsed klystron 51 has been substituted for the grid pulsed TWT 50. The most noticeable change in the cathode pulser embodiment is using two switching transistors 16*a* and 16*b* in parallel to increase the circuit reliability. The preamplifier feeds both switching transistors simultaneously. Both switching transistor outputs are connected to the high pass filter, and each switching transistor has a separate winding 30*a* and 30*b* in the feedback circuit. In addition to the increased reliability, the parallel switching transistor configuration permits current splitting of the energy on the primary side of the load transformer 52. In FIG. 2 the load transformer 52 is a loop coupling toroid filament transformer as opposed to the multi-filar toroid transformer 18 shown in the FIG. 1 embodiment. The power required to control the Klystron 51 in the secondary of the load transformer 52 is divided between the two switching transistors in the primary circuit. Additional switching transistors may be added in parallel to increase the reliability and power splitting features to further advantage.

When two or more of these switching transistor stages are connected in parallel it is desirable to provide some form of isolation between them. The hybrid couplers conventionally employed in rf work are not permitted here because of the extended low-frequency of the video pulses. One solution involves placing isolation transistors in the base or emitter circuits of each switching transistor. Following a voltage step-up output transformer after each transistor, the outputs are combined using Orgate diodes. The diodes do not have to be fast since the leakage reactance of the output transformers provide high frequency isolation. Another approach is to connect a fuse 54*a* and 54*b* in each collector circuit as shown in FIG. 2. The fuse opens that portion of the primary in the event of a short. The fuse solution Provides superior high frequency isolation because the open circuit reactance of the shorted stage is seen by the other stages, and not the leakage reactance discussed in the first method.

The cost and necessity of matched transistors for parallel operation may be avoided by properly determining the optimum base drive, collector voltage, and isolation circuit in view of the transistor gain-bandwidth, beta spread, and secondary breakdown regions. Emitter stabilization is inherent in the transistor used (3TE120). It provides the best power split and also establishes sufficient degeneration to deter secondary breakdown. However, emitter stabilization represents a large $I^2R$ loss and raises the output impedance of the low impedance primary winding.

The output of each switching transistor 16*a* and 16*b* is connected to capacitor 20 in the high pass filter via 200 ohm isolation resistors 56*a* and 56*b* respectively. In addition, each switching transistor output is applied to load transformer 52 by means of loop windings 30*a* and 30*b*. The output of the pulldown circuit is similarly in electrical communication with the load transformer 52 and loop windings 30*a* and 30*b* through a feedback loop winding 28*a*. The single loop windings increase the high frequency response by minimizing the leakage capacitance between the loop windings and between the loop windings and the transformer toroid core. While these loop windings resemble a transmission line transformer in high frequency response, they do not provide adequate low frequency response required for pulses of more than .5 microseconds.

The bifilar filament transformer portion 58 of load transformers provides a voltage step-up of 40 times from the 60 volts B plus to the 2400 volts required to pulse the cathode of klystron 51. This voltage step-up is generated by the many turns in the secondary or filament winding 58 relative to the single loop primary windings 30*a* and 30*b*. Corona discharge normally present in continuous output high voltage transformers is avoided here because the high voltage is present only when the circuits are operative to pulse the klystron. That is, the high voltage is in the form of a pulse generated by the pulser output. The short duty cycle of the transformer 52 permits the use of a Ferrox cube 3D3 core with a low ferrite content to promote high frequency response.

The preamplifier of FIG. 2 shows a stabilization requiring an additional transistor 60. Negative feedback from one of the secondaries of transformer 14 to the base of stabilizing transistor 60 effects a constant output to preamplifier transistor 12 notwithstanding fluxations in the pulser input A or variance of the B plus supply. The feedback circuit includes a resistor 62 (430 ohms) and a capacitor 64 (68pf) connection parallel. In addition the input pulse A at terminal 11 is regulated by a clipping circuit formed by resistor 66(43 ohm), resistor 68 (50 ohms) and Zener 70(4.7 volts).

It is apparent to those skilled in the art that the objects and advantages of this invention have been accomplished by providing a fast acting pulldown action which applies consistent positive feedback to steepen the pulser output trailing edge. The feedback is applied at precisely the most opportune instant to maximize the sloop of the trailing edge and avoid harmful overconduction in the transistors. A high gain bandwidth and short response time to circuit transients is insured by employing transmission line transformers between stages and a high pass filter in the feedback circuit. A fast load response is enhanced by discharging the interelectrode capacitance of the transmission tube through low impedance path offered by the load transformer and the pulldown stage. Flyback protection is provided by placing Zener diodes in the collector-base circuit of each transistor. These Zeners also provide conventional antistorage protection. Corona breakdown is eliminated by generating the required high voltage from the pulser output pulse by means of a high step-up transformer.

While the invention has been shown and described in particular terms and embodiments, it is apparent that changes may be made without departing from the scope of the invention. For example, the power splitting and reliability features of the cathode pulsed FIG. 2 embodiment may be readily employed in the grid pulsed FIG. 1 embodiment. The same is true of the loop toroid step-up transformer and the stabilized peramplifier.

We claim as our invention:

1. A pulser circuit responsive to an input pulse signal for supplying to a load an output pulse signal having a steep trailing edge, comprising in combination:

a switching stage having an input terminal means for receiving said input pulse, and having an output which is adapted to be in electrical communication with said load;

a pulldown stage operable to be turned on by a signal generated in response to the trailing edge of said output pulse signal;

means for electrically coupling the output of said pulldown stage to the output of said switching stage for supplying positive feedback to the output of said switching stage during the presence of said output pulse signal; and high pass filter means for generating said signal generated in response to the trailing edge of said output pulse signal.

2. The video pulser circuit of claim 1, wherein the high pass filter comprises:

a capacitor; and a signal developing impedance means electrically connected between the capacitor and the input of the pulldown stage.

3. The pulser circuit of claim 2, wherein the switching stage and the pulldown stage each comprise at least one transistor means having base, collector, and emitter electrodes.

4. The pulser circuit as specified in claim 3, wherein the high pass filter impedance means is a current step-up high gain bandwidth transmission line transformer electrically connected between said capacitor and the base electrode of the pulldown stage transistor for increasing the base drive current to the pulldown stage transistor and for developing the said signal on the base of the pulldown stage.

5. The pulser circuit of claim 3, wherein the switching stage comprises a plurality of transistor means operating in parallel.

6. The pulser circuit of claim 3, wherein the means for coupling feedback is a high gain bandwidth transformer comprising:

a pulldown winding electrically connected to the output of the pulldown stage; and a switching winding electrically connected to the output of the switching stage and in magnetic flux communication with the pulldown winding.

7. The pulser circuit of claim 6, wherein the pulldown winding is electrically connected across the collector and emitter electrodes of the pulldown transistor for applying the proper supply voltage to the pulldown transistor which is induced into the pulldown winding from the switching winding during the transient portion of the switching stage output.

8. The pulser circuit of claim 6, wherein a first and a second fast acting switching device is connected between the collector electrode and base electrode of the switching transistor and the pulldown transistor respectively, the devices being responsive to the flyback voltages generated by changing magnetic fields in the switching winding and pulldown winding respectively to cause the respective transistor to turn on as the flyback voltage and current develops and pass the flyback energy through the respective transistor without damage thereto.

9. The pulser circuit of claim 6, wherein the transistors are normally off and are pulsed on by the pulser input pulse.

10. The pulser circuit of claim 6, wherein the high gain bandwidth transformer is a transmission line transformer having step-up secondary adapted to be electrically connected to the load.

11. The pulser circuit of claim 6, wherein the high gain bandwidth transformer is a loop coupling transformer having a step-up secondary which is adapted to be electrically connected to a load.

12. The pulser circuit of claim 6, wherein the switching stage comprises a plurality of transistor switching devices operating in parallel, and a plurality of switching windings are provided one connected to each switching device output.

* * * * *